(12) United States Patent
Oh et al.

(10) Patent No.: US 9,846,309 B2
(45) Date of Patent: Dec. 19, 2017

(54) DEPTH-PRIORITY INTEGRAL IMAGING DISPLAY METHOD USING NONUNIFORM DYNAMIC MASK ARRAY

(71) Applicant: DONGSEO UNIVERSITY TECHNOLOGY HEADQUARTERS, Busan (KR)

(72) Inventors: Yong Soek Oh, Busan (KR); Dong Hak Shin, Busan (KR); Byung Gook Lee, Busan (KR)

(73) Assignee: DONGSEO UNIVERSITY TECHNOLOGY HEADQUARTERS (KR)

( * ) Notice: Subject to any disclaimer, the term of this patent is extended or adjusted under 35 U.S.C. 154(b) by 0 days.

(21) Appl. No.: 14/698,650

(22) Filed: Apr. 28, 2015

(65) Prior Publication Data
US 2016/0306182 A1 Oct. 20, 2016

(30) Foreign Application Priority Data

Apr. 17, 2015 (KR) ........................ 10-2015-0054301
Apr. 17, 2015 (KR) ........................ 10-2015-0054551

(51) Int. Cl.
G02B 27/22 (2006.01)

(52) U.S. Cl.
CPC ..... G02B 27/2214 (2013.01); G02B 27/2264 (2013.01)

(58) Field of Classification Search
None
See application file for complete search history.

(56) References Cited

U.S. PATENT DOCUMENTS

| 7,064,895 B2 * | 6/2006 | Morishima | G02B 27/2214 348/56 |
| 2002/0118452 A1 * | 8/2002 | Taniguchi | G02B 27/2214 359/463 |
| 2005/0139788 A1 * | 6/2005 | You | B23K 26/066 250/492.22 |
| 2011/0157697 A1 * | 6/2011 | Bennett | G06F 3/14 359/462 |
| 2014/0192171 A1 * | 7/2014 | Shin | H04N 13/0406 348/55 |

FOREIGN PATENT DOCUMENTS

| KR | 10-2007-0040623 | 4/2007 |
| KR | 10-2008-0005442 | 1/2008 |
| KR | 10-2013-0001873 | 1/2013 |

* cited by examiner

*Primary Examiner* — Darryl J Collins
*Assistant Examiner* — Journey Sumlar
(74) *Attorney, Agent, or Firm* — Innovation Counsel LLP (57) ABSTRACT

Disclosed is a depth-priority integral imaging display method using a nonuniform dynamic mask array which makes it possible to enhance the resolutions in both horizontal and vertical directions in such a way to change a division boundary of a mask pattern and use a two-times time multiplexing. It is possible to enjoy the images of clear resolutions even in the product of 60 Hz, and the afterimages at the division boundary may be eliminated by changing the dividing direction of the mask, so the images with clearer resolutions can be displayed.

9 Claims, 8 Drawing Sheets

Figure 3 x-coordinate    y-coordinate

1 Block = 4 Masks

Figure 16

DEPTH-PRIORITY INTEGRAL IMAGING DISPLAY METHOD USING NONUNIFORM DYNAMIC MASK ARRAY

CROSS-REFERENCE TO RELATED APPLICATION

This U.S. non-provisional patent application claims priority under 35 U.S.C. §119 to Korean Patent Application No. 10-2015-0054301 and 10-2015-0054551, filed on Apr. 17, 2015, the contents of which are hereby incorporated by reference in its entirety.

BACKGROUND

Technical Field

The present inventive concept relates to a depth-priority integral imaging display method using a nonuniform dynamic mask array which makes it possible to enhance the resolutions in both horizontal and vertical directions in such a way to change a division boundary of a mask pattern and use a two-times time multiplexing.

Description of the Related Art

New researches about a 3D image and an image reproducing technology are being recently conducted and attracting huge attentions from people.

The imaging technology becomes advanced and is being technically integrated.

The demand for the 3D images increases since it looks more natural like a real human as compared with a 2D image.

The 3D image reproducing technology is directed to a technology for expressing 3D so that an observer can experience a 3D image having a cubic effect and a reality-like effect rather than a plane image.

The method for reproducing the 3D images may be categorized into a stereoscopy method, a holography method, an integral imaging method, etc., for which a variety of technologies are underway.

Among the above-listed methods, the integral method was first suggested by Lippmann in 1908. Thereafter, the integral imaging method has been researched into the next generation 3D image reproducing technology.

As a prior art document related to the above 3D integral imaging method, there is the Korean patent registration No. 0891160 which discloses a method for compressing elemental images by applying a region division technology in an elemental image compression apparatus. The elemental image compression method using a region division technology may include a step (a) for obtaining, from a 3D object, elemental images with different time differences through a lens array, a step (b) for dividing the obtained elemental images into analogous regions with a plurality of analogous images depending on an analogous correlation, a step (c) for rearranging the images in each analogous region into a 1D elemental image arrangement, and a step (d) for compressing the rearranged and created 1D elemental image arrangements.

In addition, as another example of the prior art document, there is the Korean patent registration No. 0942271 which discloses a method for recovering an integral image using an elemental image which is picked up using a lens array. The method for integrally recovering images may include a step wherein the elemental image is enlarged into a predetermined size, and a recovery image is created by combining the pixels positioned at the same coordinates of each enlarged elemental image, a step wherein the recovery image corresponding to an inflection point of a blur metric value based on a focal distance is selected as a focus image, a step wherein an erosion image is created through an erosion calculation wherein each pixel value of an erosion mask is subtracted from each pixel value of the focal image, and a step wherein the erosion image is mapped on the recovery image.

In addition, the Korean paten registration No. 1294261 filed by the applicant of the present inventive concept discloses a method for displaying 3D integral images using a mask and a time division method. The method for displaying 3D integral images using a mask and a time multiplexing, wherein a 3D image is displayed in a space in such a way that elemental images obtained from a 3D object is obliged to pass through a lens array and a mask, and the mask consists of a blocking region through which elemental images cannot pass and a transmission region through which the elemental images can pass, thus allowing to display 3D images. The mask has the same size as the corresponding lens array, and the blocking region and the transmission region are arranged so that the positions thereof can alternately selected in sequence as time passes, thus displaying 3D images.

However, according to the above-described prior art method, the less the size of the transmission region of a mask panel, the better the resolution of the images, but in this case the number of the time multiplexing may increase, thus lowering the refresh rate.

SUMMARY

The present inventive concept is made in an effort to improve the above-described problems. It is an object of the present inventive concept to provide a depth-priority integral imaging display method using a nonuniform dynamic mask array which makes it possible to enhance the resolutions in both horizontal and vertical directions in such a way to change a division boundary of a mask pattern and use a two-times time multiplexing.

To achieve the above objects, there is provided a depth-priority integral imaging display method using a nonuniform dynamic mask array, wherein the elemental images stored in an image obtaining apparatus sequentially pass through a lens array and a mask panel, thus displaying 3D images in a space. The mask panel consists of a blocking region through which each elemental image cannot pass, and a transmission region through an elemental image can pass, by dividing into two parts each basic lens of the lens array, and the positions of the blocking region and the transmission regions are alternately changed depending on the passing of time.

A depth-priority integral imaging display method using a nonuniform dynamic mask array according to an exemplary embodiment of the present inventive concept includes transmitting elemental images through a lens array and a mask panel, thus displaying 3D images, wherein the mask panel includes a blocking region through which each elemental image cannot pass and a transmission region through which the elemental image cannot pass, and changing positions of the blocking region and the transmission region. The blocking region and the transmission region both corresponding to each basic lens may be designated as one block, and the positions of the blocking region and the transmission region in the one block is changed as time passes.

The one block of the mask panel may include one blocking region and one transmission region, the one blocking region and the one transmission region being arranged along a horizontal direction in a first block and the one blocking region and the one transmission region being arranged along a vertical direction in a second block adjacent to the first block.

Locations of the one blocking region and the one transmission region may be exchanged as time passes.

Location of the one blocking region and the one transmission region may rotate 90 degree as time passes.

The one block of the mask panel may include one blocking region and one transmission region, the one blocking region and the one transmission region being arranged along a diagonal direction.

It is advantageous that the depth-priority integral imaging display method using a nonuniform dynamic mask array makes it possible to enhance the resolutions in both horizontal and vertical directions in such a way to use a two-times time multiplexing, while creating the images of clear resolutions even in a product with 60 Hz. Much clearer resolution images may be creased in such a way to eliminate the afterimage at a division boundary by changing the division direction of the mask.

BRIEF DESCRIPTION OF THE DRAWINGS

The present inventive concept will become better understood with reference to the accompanying drawings which are given only by way of illustration and thus do not limit the present inventive concept, wherein.

DETAILED DESCRIPTION

The depth-priority integral imaging display method using a nonuniform dynamic mask array according to the present inventive concept is directed to a configuration wherein the elemental images stored in an image obtaining apparatus 130 are obliged to pass in sequence through a lens array 220 and a mask panel 240 with the aid of a display apparatus 230, thus displaying a 3D image 210 in a space. The mask panel 240 consists of a blocking region 242 through which each elemental image cannot pass, and a transmission region 241 through which the elemental image can pass, both the regions being defined by dividing into two parts each basic lens. The positions of the blocking region 242 and the transmission region 241 alternately change as time passes.

The blocking region 242 and the transmission region 241 each corresponding to each basic lens are designated as one block, so the positions of the blocking region 242 and the transmission region 241 are alternately change in the block.

The blocking region 242 and the transmission region 241 of the mask panel 240 may be configured so that the horizontal division and the vertical division can alternately be repeated.

The blocking region 242 and the transmission region 241 of the mask panel 240 may be divided in a diagonal direction.

In addition, the multiple blocking regions 242 and the multiple transmission regions 241 of the mask panel 240 may be designated as one lock, so the positions of the blocking regions 242 and the transmission regions 241 may alternately change in the block.

The depth-priority integral imaging display method using a nonuniform dynamic mask array according to the present inventive concept will be described in detail with reference to the accompanying drawings.

Figure 1:
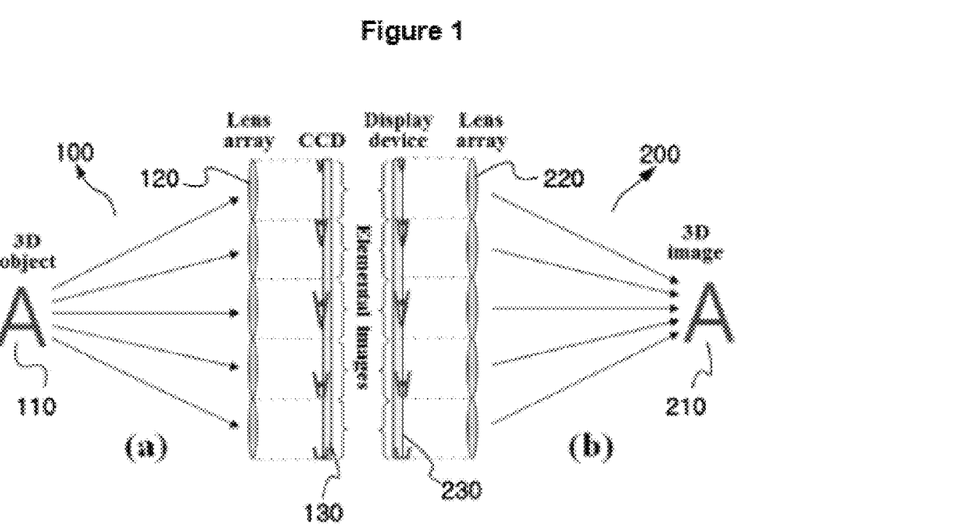
FIG. 1 is a schematic view illustrating a basic principle of an integral image method.

FIG. 1 is a schematic view illustrating a basic principle of an integral imaging method.

The method for reproducing a 3D object 110 into a 3D image 210 may basically include an image obtaining step 100 wherein the 3D image 110 is processed into elemental images using the image obtaining apparatus 130, and an image reproducing step 200 wherein the elemental images obtained in the image obtaining step 100 are displayed on a display apparatus 230, thus reproducing a 3D image in a space with the aid of a lens array 220.

More specifically, the integral imaging technology, as illustrated in FIG. 1, may include the image obtaining step 100 and the image reproducing step 200.

In the image obtaining step 100, multiple images formed by the lens array 120 are recorded in an image obtaining apparatus 130, for example, a CCD camera, etc.

At this time, the images recorded in the image obtaining apparatus 120 are called elemental images.

On the contrary, in the image reproducing step 200, the recorded elemental images are displayed on the display apparatus 230 and are sequentially pass through the lens array 220 in the same manner as when the elemental images are obtained, thus restoring the 3D image in the space.

The elemental images in the image obtaining step 100 are substantially the same as the elemental images 230 in the image reproducing step 200.

Figure 2:
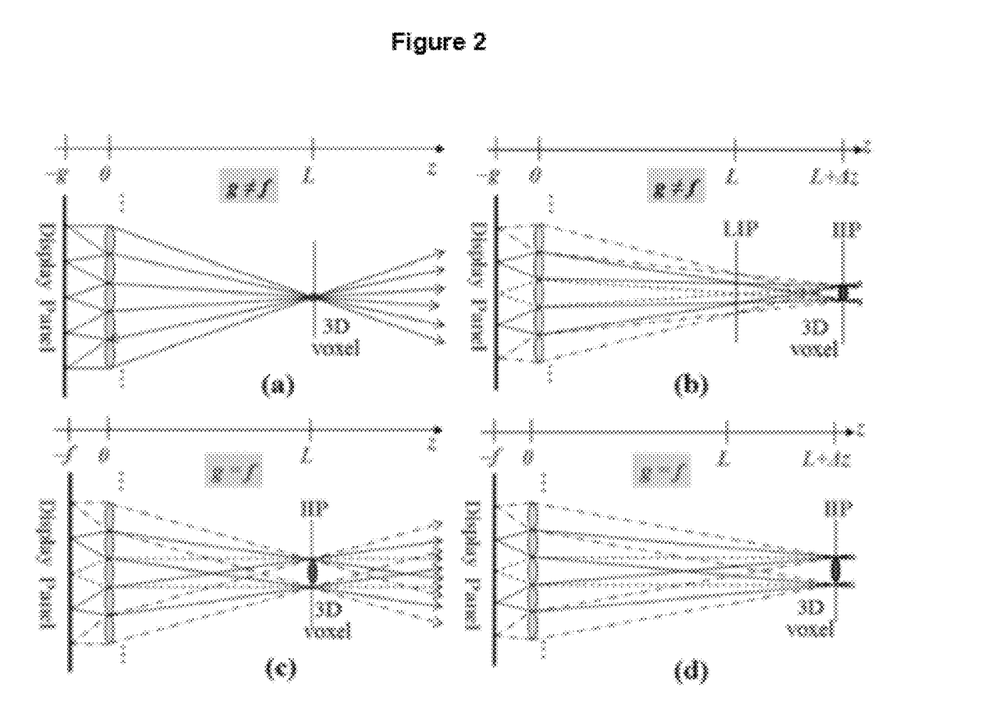
FIG. 2 is a schematic view illustrating a category of an integral image display.

FIG. 2 is a schematic view illustrating a category of the integral image display.

As illustrated in FIG. 2, the 3D integral imaging display technology may be categorized into two methods based on a distance (g) between the display panel and the lens array.

FIGS. 2(a) and 2(b) are views illustrating the method which is called a resolution-priority integral imaging (RPII) and has a structure of g≠f.

Here, f is a focal distance of the lens.

As illustrated in FIG. 2(a), multiple points in the elemental images picked up from the same object point are superimposed or overlapped on the same point (z=L) by the lens formula, thus forming a voxel which represents a value on a regular grid in three-dimensional space.

Since the distance (Δz) between the IIP (Integral Image Plane) and the LIP (Lens Image Plane) is zero, the size of the voxel is very small, and as a result, the resolution of the 3D image is high.

As illustrated in FIG. 2B, in case where Δz≠0 (LIP≠IIP), the higher the value Δz, the higher the size of the voxel. But the resolution of the image becomes bad in inverse proportion to the square of the size of the voxel, so it is necessary to maintain the IIP close to the LIP to obtain a 3D image having a desired resolution.

More specifically, the resolution-priority integral imaging may allow to display high resolution 3D images, but 3D depth to be expressed is very limited.

FIGS. 2(c) and 2(d) are views illustrating the depth-priority integral imaging (depth-priority InIm, DPII) whose feature is the structure of g=f.

The light from a light source positioned at a focal distance of the lens can advance a little distance in parallel even though the light cannot advance a long distance in parallel because of a diffraction of the light.

Therefore, different from the resolution-priority integral imaging, the image formation does not occur in the depth-priority integral imaging.

As illustrated in FIG. 2(c), a voxel forms as a result of the superimposition of multiple lights at z=L.

The depth-priority integral imaging display does not have any image formation, but a voxel forms due to the superimposition of multiple lights which advance in parallel.

Since the voxel created has the same size as the basic lens, the resolution of the 3D image is much lower than that illustrated in FIG. 2(a).

Meanwhile, as illustrated in FIG. 2(d), even in case where Δz≠0, the size of the voxel is the same as that as illustrated in FIG. 2(c).

Therefore, it is theoretically possible to have the IIP at any position where z>0.

However, the maximum depth may be determined based on the diffraction theory. This means that the range of the depth for expressing the 3D images is wider than that of the RPII.

In addition, it is possible to express to the range of the same depth even in the real image region (z>0) as well as the virtual image region z<0).

Summarizing the above descriptions, the 3D resolution may be low because of the size of the 3D voxel, but it is possible to display the 3D images having a very deep depth feeling which may integrate the real image region and the virtual image region.

If the resolution issue which is the problem of the depth-priority integral imaging was resolved, it could be possible to secure a deep depth feeling and a high resolution using a simple structure. In this matter, such a technology may be a representative technology for the space image 3D display.

Figure 3:
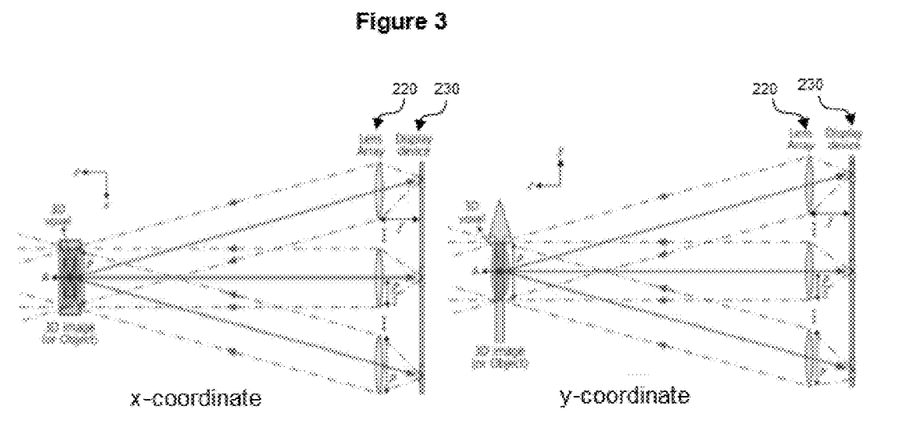
FIG. 3 is a schematic view illustrating a corresponding relationship between an object point coordinate and an elemental image point coordinate, the relationship being adapted as a geometrical optics elemental image creation principle in a basic depth-priority integral imaging (DPII)
Figure 4:
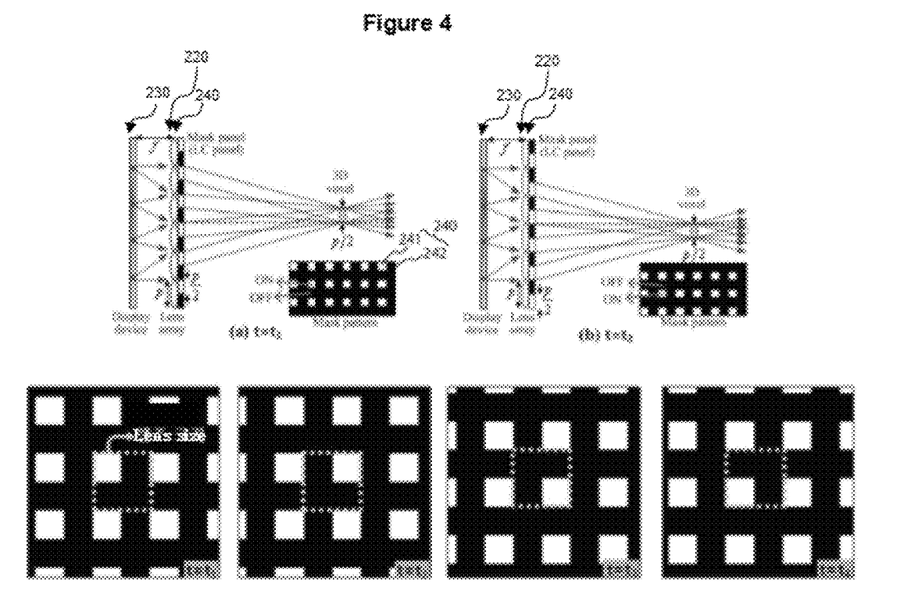
FIG. 4 is a schematic view illustrating a depth-priority integral imaging (DPII) system using a mask panel.

FIG. 3 is a schematic view illustrating a corresponding relationship between an object point coordinate and an elemental image point coordinate, the relationship being adapted as a geometrical optics elemental image creation principle in a basic depth-priority integral imaging (DPII), and FIG. 4 is a schematic view illustrating a depth-priority integral imaging (DPII) system using a mask panel.

In order to display the 3D images, the elemental images should be expressed at the display device 230, and the mask pattern corresponding thereto should be expressed on the mask panel 240.

For convenience, the descriptions will continue with the time multiplexing ($t_1$, $t_2$) wherein the basic lens is divided into two parts in the vertical direction.

FIG. 4(a) is a view illustrating the operation principle of the display system when $t=t_1$.

As illustrated in FIG. 4(a), the mask pattern ($t=t_1$) is expressed on the mask panel 240, and at the same time the elemental images ($t=t_1$) should be expressed at the display device 230.

Then the lights from the elemental images pass through the mask pattern, and the size of the light beam reduces, and the lights cross each other in a space, thus forming a voxel.

In case of the configuration as illustrated in FIG. 4(a), the size of the voxel is p/2 which is the same as the size of the transmission region 241 which corresponds to an ON region of the mask panel 240.

In this case, since the size reduces in half as compared with the conventional method wherein the mask panel 240 is not used, it means that the resolution of the 3D images may increase two times.

In addition, FIG. 4(b) is a view illustrating the case where $t=t_2$.

The mask pattern ($t=t_2$) is expressed on the mask panel 240, and the elemental images ($t=t_2$) are expressed at the display apparatus 230.

Like in FIG. 4(a), the size of the voxel created in the space is p/2, and the 3D resolution can be enhanced two times as compared with the conventional method. Here, p is a pitch of the lens.

However, the differences between the configurations in FIGS. 4(a) and 4(b) lie in that the positions of the creations of the voxels are different. The complementary positions of the voxels can be occupied without any gaps, thus contributing to enhanced resolutions.

Here the term "voxel" means a combination of volume and pixel and is called a basic unit of the 3D images corresponding to the pixel which is the basic unit of the 2D images.

In addition, the positions of the transmission region 241 and the blocking region 242 of the mask panel 240 may alternately change in sequence as time passes, thus allowing to display more clear 3D images 210.

Since the alternating of the transmission region 241 and the blocking region 242 of the mask panel 240 and the alternating of the elemental images corresponding thereto in the display apparatus 230 are performed very fast, an ordinary person cannot recognize any changes therein due to the afterimages.

According to the mask method, the resolution of the elemental images can be enhanced two times.

Figure 5:
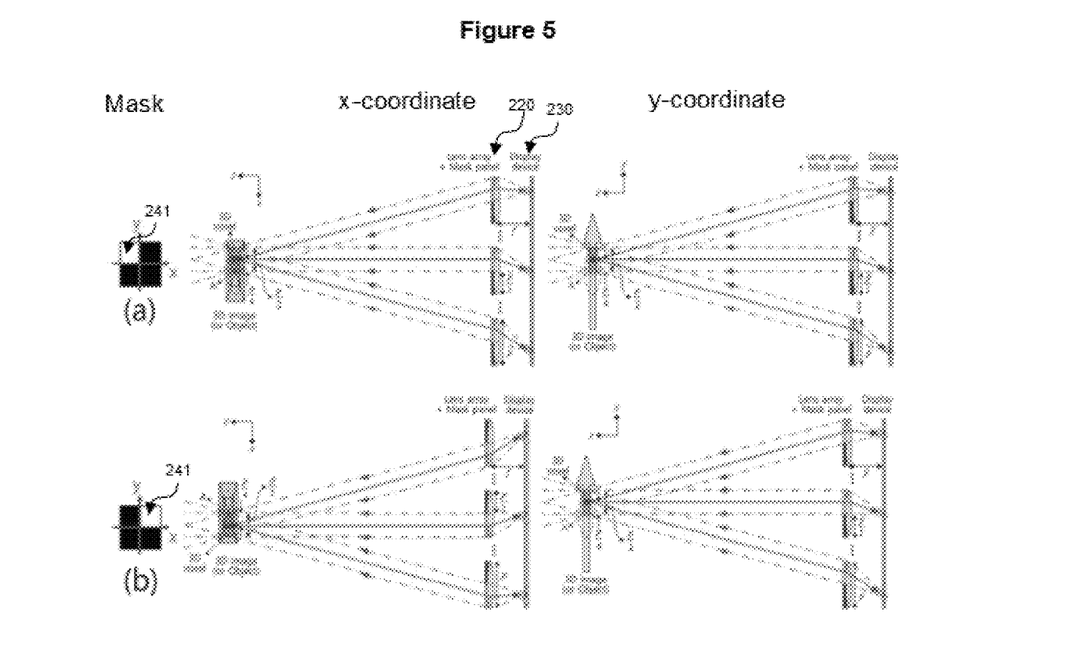
FIGS. 5 and 6 are schematic views illustrating a corresponding relationship between an object point coordinate and an elemental image point coordinate, the relationship being adapted as a geometrical optics elemental image creation principle in a depth-priority integral imaging (DPII) in a mask panel.
Figure 6:
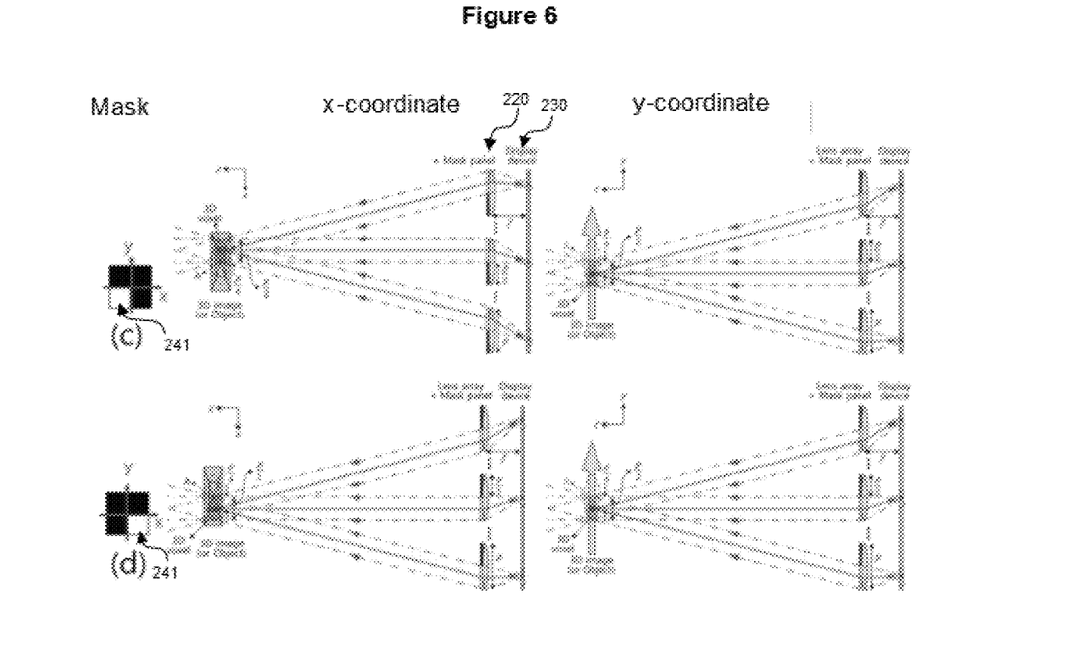

FIGS. 5 and 6 are schematic views illustrating a corresponding relationship of the object point coordinate and the elemental image point coordinate, the relationship being adapted as a geometrical optics elemental image creation principle in the depth-priority integral imaging (DPII) using a mask panel.

As illustrated in FIGS. 5 and 6, the coordinates with respect to the shapes of the mask pattern are used. If the transmission region 241 is expressed in the form of x- and y-coordinate values in the mask panel 240 wherein each mask is divided in 2×2, four occasions in FIGS. 5(a) and 5(b) and FIGS. 6(a) and 6(b) may be expressed.

As illustrated in FIG. 5(a), the transmission region 241 is in the minus direction on the x-axis and is in the plus direction on the y-axis, and as illustrated in FIG. 5(b), the transmission region 241 is in the plus direction on both the x-axis and the y-axis.

In addition, as illustrated in FIG. 6(a), the transmission region 241 is in the minus direction on both the x-axis and the y-axis, and as illustrated in FIG. 6(b), the transmission region 241 is in the plus direction on the x-axis and is in the minus direction on the y-axis.

If the size of the transmission region 241 of each mask panel 240 reduces in half, the size of the formed voxel reduces in half.

Even though the size of the voxel reduces, the number of the voxels does not change.

Namely, it is impossible to get a maximum resolution of the 3D images due to the physically reduced size of the voxel and the fixed number of the voxels.

Therefore, the time multiplexing technology is used to get a maximum resolution of the 3D images, wherein four sequences are continuously expressed so as to increase the number of displayed voxels.

This is why the dynamic mask should be used, wherein the mask pattern changes for each sequence.

As a result, the resolution of the displayed 3D image can be enhanced 4(=2(H)×2(v)) times.

In order to display the 3D images with enhanced resolution, four (=2×2) sequences should be expressed in a time multiplexing manner, for example.

For this reason, the screen reproducing ratio of the normal 3D images reduces by ¼ as compared with the refresh rate of the display apparatus.

The refresh rate of the 3D image may be expressed as follows.

The refresh rate of the 3D image=maximum refresh rate (of the 2D display apparatus)/the number of time multiplexing.

For example, in case where 2D is 120 frames/s (or Hz), 3D becomes 30 frames/s (or Hz), 120/4=30[frames/s (or Hz)].

In case where 2D is 60 frames/s, 3D becomes 15 [frames/s], 60/4=15[frames/s (or Hz)].

The smaller the size of the transmission region of the mask, the higher the resolution of the 3D images, but since the number of the time multiplexing increases, the refresh rate of the 3D image lowers more.

It is known that the minimum changing speed of the (2D or 3D) images for inducing the afterimage effects of eyes is 30 frames/s.

If the resolution of the 3D images is increased 4 times, it needs to prepare the display apparatus whose maximum refresh rate is 120 Hz.

However, in case of the 2D display apparatus which is most commonly available in the market, most of the products have the maximum refresh rate of 60 Hz, and the price of the product of 120 Hz is higher than that of the product of 60 Hz.

Therefore, in case of the depth-priority integral imaging display system using the dynamic mask, it needs to lower the number of multiplexing to less than 2 in order to apply the FPD of 60 Hz to the 2D display apparatus and the mask panel.

In addition, when the product of 120 Hz is used, if the refresh rate of the 3D image may be increased higher than 30 Hz, it might be possible to improve, for example, blinking, etc. which occur at 2D FPD.

The present inventive concept suggests the depth-priority integral imaging display method using a nonuniform dynamic mask array which makes it possible to enhance the resolutions in both the horizontal and vertical directions by using two-times time multiplexing (or two sequences).

For reference, in case of the method wherein the conventional dynamic mask is used, the shapes of each of the masks in the mask panel 240 which are expressed in one sequence are same.

Namely, the patterns of the mask panel 240 are uniform.

Figure 7:
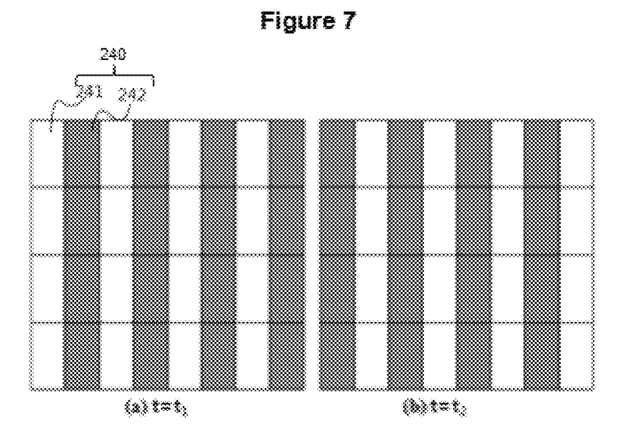
FIG. 7 is a schematic view illustrating a basic principle of a mask pattern of a 2-division method.

FIG. 7 is a schematic view illustrating a basic principle of the mask pattern of the two-division method.

As illustrated in FIG. 7, the mask pattern is formed so that each basic lens of the lens array 220 can be divided into two parts.

Namely, the mask panel 240 consists of the blocking region 242 through which each elemental image cannot pass, and the transmission region 241 through which the elemental image can pass, both the regions being formed by dividing each basic lens into two parts. The transmission region 241 and the blocking region 242 are uniformly divided in the horizontal direction.

Finally, the two-times time multiplexing is necessary, and the whole resolutions can increase two times.

However, the resolution increases in only the horizontal direction, and the resolution does not change in the vertical direction.

In the depicted present inventive concept, the transmission region 241 and the blocking region 242 are divided in the horizontal direction.

If the transmission region 241 and the blocking region 242 are divided in the vertical direction, the resolution increases in only the vertical direction, and the resolution does not change in the horizontal direction.

In addition, if the transmission region 241 and the blocking region 242 are fixed, there may be afterimages at the boundary.

Figure 8:
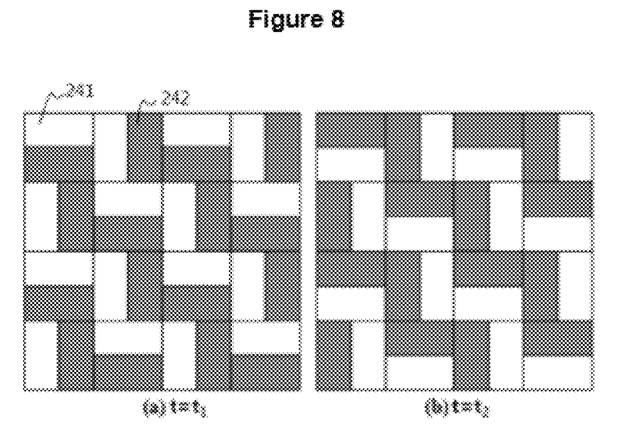
FIG. 8 is a schematic view illustrating a mask pattern used in a depth-priority integral imaging display method using a nonuniform dynamic mask array according to the present inventive concept.
Figure 9:
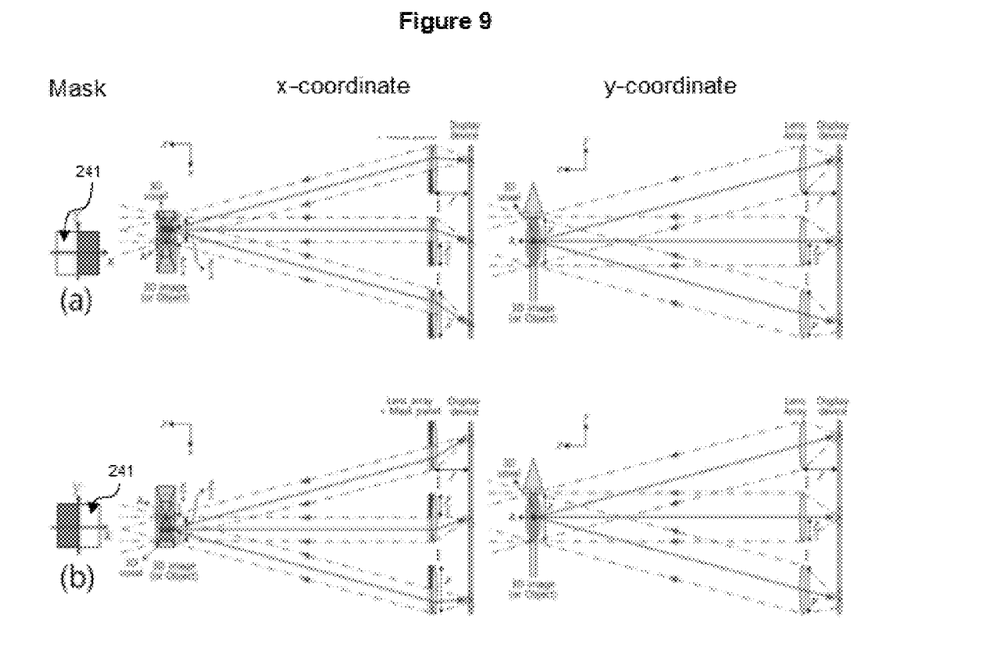
FIGS. 9 and 10 are schematic views illustrating a corresponding relationship between an object point coordinate and an elemental image point coordinate, the relationship being adapted as a geometrical optics elemental image creation principle which applies to FIG. 8.
Figure 10:
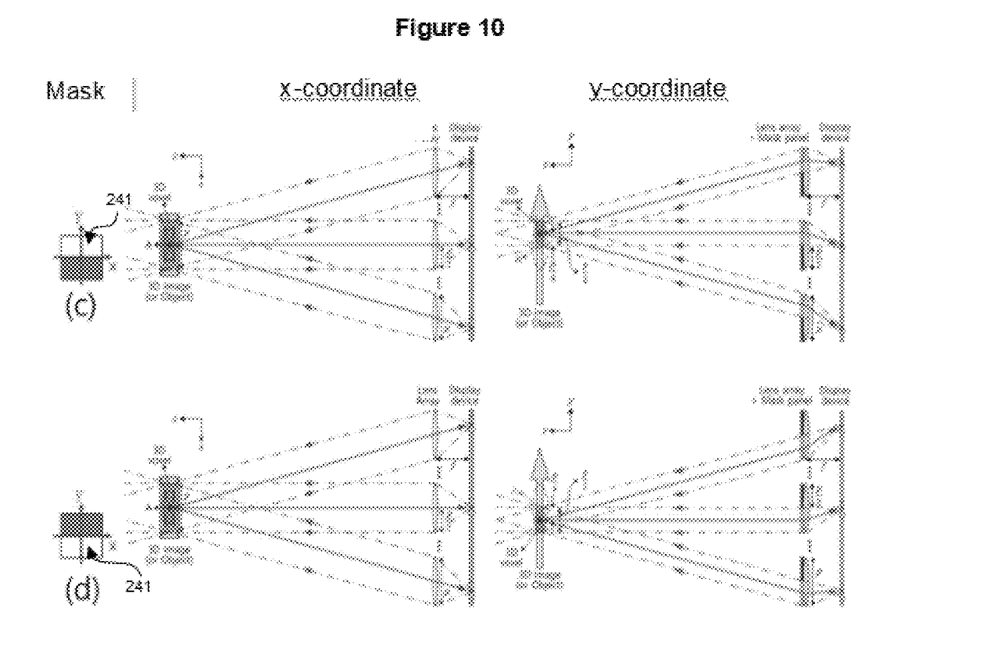

FIG. 8 is a schematic view illustrating a mask pattern used in a depth-priority integral imaging display method using a nonuniform dynamic mask array according to the present inventive concept, and FIGS. 9 and 10 are schematic views illustrating a corresponding relationship between an object point coordinate and an elemental image point coordinate, the relationship being adapted as a geometrical optics elemental image creation principle which applies to FIG. 8.

As illustrated in FIG. 8, the depth-priority integral imaging display method using a nonuniform dynamic mask array according to the present inventive concept is characterized by the configuration wherein the elemental images stored in the image obtaining apparatus 130 are sequentially pass through the lens array 220 and the mask panel 240 with the aid of the display device 230, thus allowing to display 3D images 210 in the space, and the blocking region 242 through which each elemental image cannot pass and the transmission region 241 through which the elemental image can pass are formed on the mask panel 240, both the region being defined by dividing each basic lens into two parts, and the positions of the blocking region 242 and the transmission region 241 alternately change as time passes.

In addition, since the blocking region 242 and the transmission region 241 of the mask panel 240 are configured in such a way that the divisions in the horizontal direction and the vertical direction alternately change, thus eliminating the afterimages at the division boundary.

Namely, the mask pattern may be formed in such a way that each basic lens of the lens array 220 can be divided into two parts in the diagonal direction (45° or 135°).

In order for the divided transmission region 241 and blocking region 242 to be formed in the diagonal directions, the group of the transmission regions 142 may be provided at one side surface and the group of the blocking region 242 may be provided at the other side surface, both of the groups being arranged along a diagonal line and like a computer bit map image file.

The resolutions may statistically enhance by $\sqrt{2}$ times.

$$(u\sqrt{2}s\sqrt{2}=2)$$

As illustrated in FIGS. 9 and 10, the shapes and positions of the mask pattern may be obtained by the coordinates in the horizontal direction and the vertical direction.

Since the pixels which form the lowest resolution quality are quadrangle, the positions of the minimum units can be obtained by the coordinate values of the x-axis and the y-axis.

Referring to FIG. 9(a), in the transmission region 241, the image on the x-axis is in the minus direction, and the image on the y-axis is in both the plus and minus directions, and referring to FIG. 9(b), the image on the x-axis is in the plus direction, and the image on the y-axis is in both the plus and minus directions.

In addition, as illustrated in FIG. 10(a), in the transmission region, the image on the x-axis is in both the plus and minus directions, and the image on the y-axis is in the plus direction, and as illustrated in FIG. 10(b), the image on the x-axis is in both the plus and minus directions, and the image on the y-axis is in the minus direction.

Namely, if the division is performed in the horizontal direction, in the transmission region, the image on the y-axis is always in both the plus and minus directions, and the image on the x-axis is alternately in the plus and minus directions.

In addition, if the division is performed in the vertical direction, in the transmission region, the image on the x-axis is always in both the plus and minus directions, and the image on the y-axis is alternately in the plus and minus directions.

Figure 11:
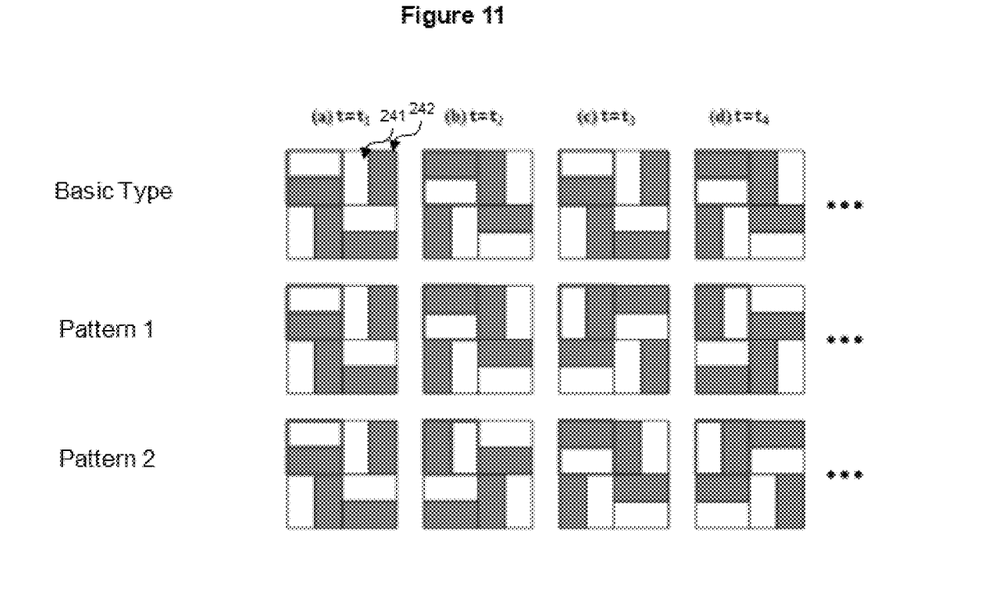
FIG. 11 is a view illustrating a use state of horizontally and vertically divided mask patterns which apply to a depth-priority integral imaging display method using a nonuniform dynamic mask array according to the present inventive concept.

FIG. 11 is a view illustrating a use state of horizontally and vertically divided mask patterns which apply to a depth-priority integral imaging display method using a nonuniform dynamic mask array according to the present inventive concept.

As previously described, if the transmission region 241 and the blocking region 242 are fixed, the afterimages at the division boundary may remain. In this case, in the blocking region 242 and the transmission region 241 of the mask panel 240, the horizontal direction division and the vertical direction division may be alternately performed, thus eliminating the afterimages at the division boundary.

In addition, the blocking region 242 and the transmission region 241 both corresponding to each basic lens may be designated as one block and may be rotated in the clockwise direction or the counterclockwise direction by 90°, thus eliminating the afterimages at the division boundary.

Figure 12:
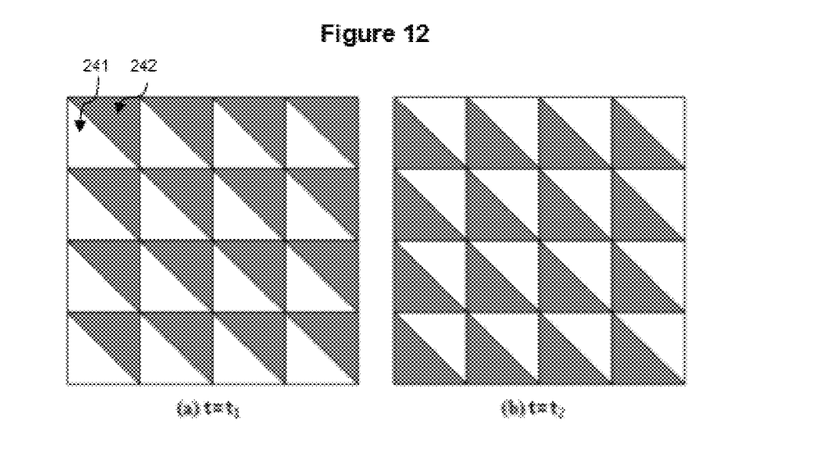
FIG. 12 is a schematic view illustrating a diagonally divided mask pattern which applies to a depth-priority integral imaging display method using a nonuniform dynamic mask array according to the present inventive concept.

FIG. 12 is a schematic view illustrating a diagonally divided mask pattern which applies to a depth-priority integral imaging display method using a nonuniform dynamic mask array according to the present inventive concept.

The mask pattern may be formed so that each basic lens of the lens array 22 can be divided into two parts in the diagonal direction (45° or 135°).

In order for the divided transmission region 241 and blocking region 242 to be formed in the diagonal directions, the group of the transmission regions 142 may be provided at one side surface and the group of the blocking region 242 may be provided at the other side surface, both the groups being arranged along a diagonal line and like a computer bit map image file.

Figure 13:
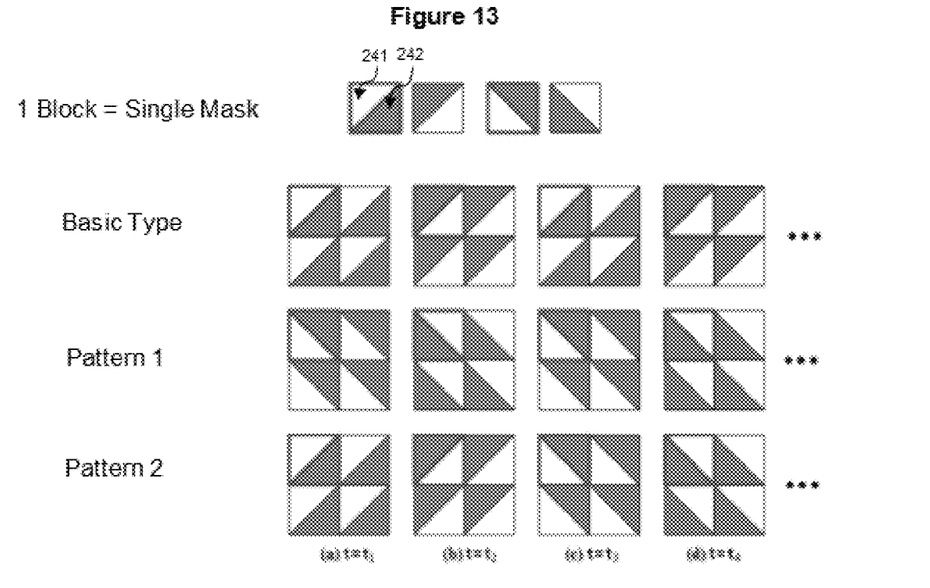
FIGS. 13 to 15 are schematic views illustrating another exemplary embodiment of a diagonally divided mask pattern which applies to a depth-priority integral imaging display method using a nonuniform dynamic mask array according to the present inventive concept.
Figure 14:
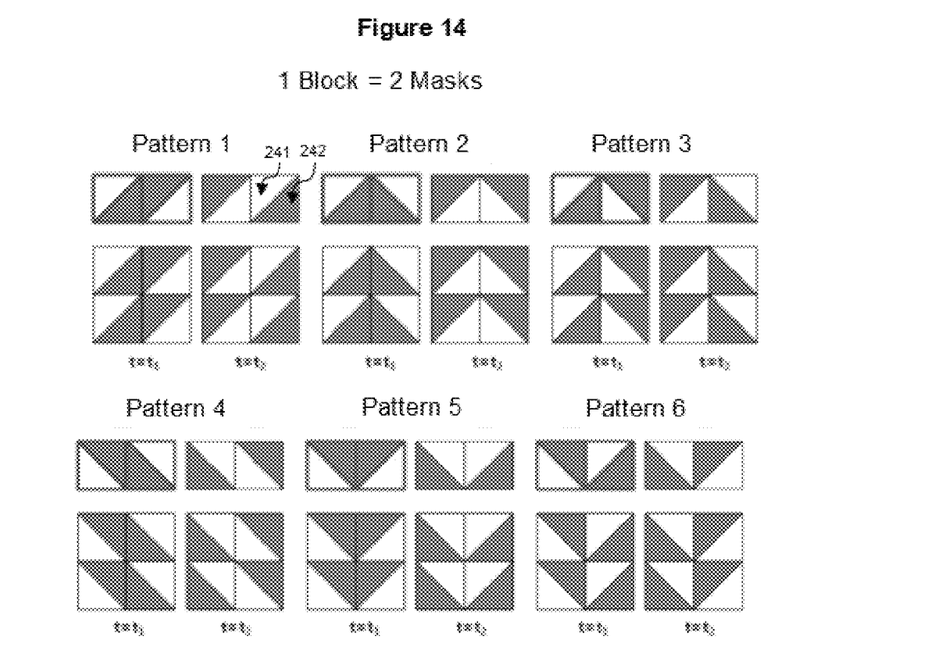
Figure 15:
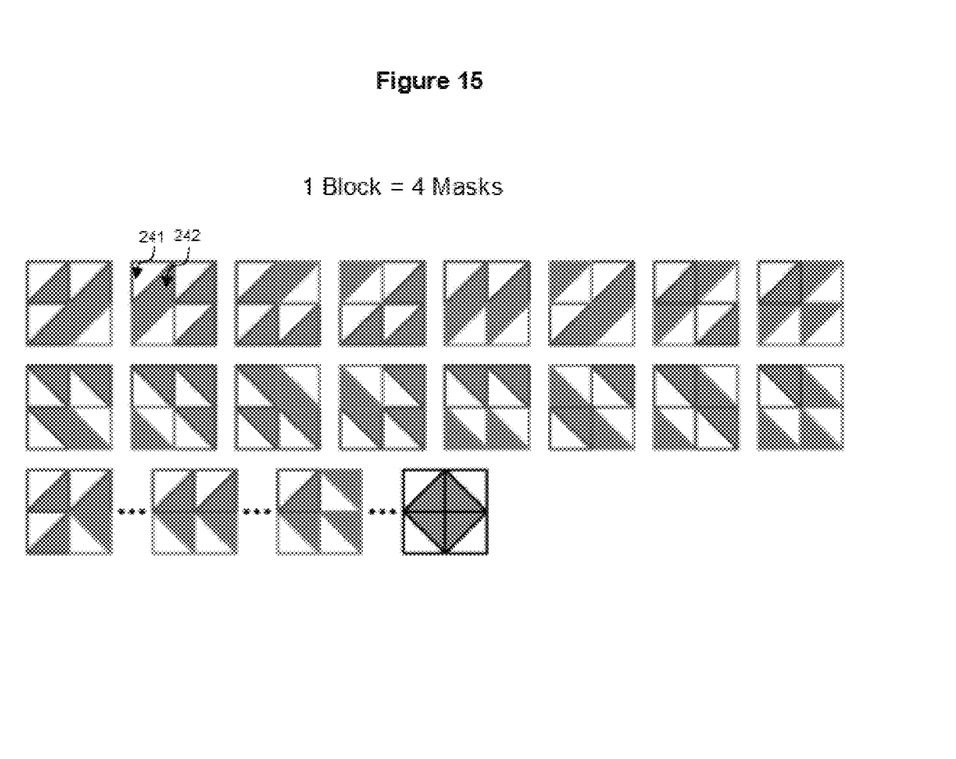

FIGS. 13 to 15 are schematic views illustrating another exemplary embodiment of a diagonally divided mask pattern which applies to a depth-priority integral imaging display method using a nonuniform dynamic mask array according to the present inventive concept.

Namely, FIG. 13 is a view illustrating a configuration wherein one mask is designated as an independent block, and FIG. 14 is a view illustrating a configuration wherein two masks are designated as one block, and FIG. 15 is a view illustrating a configuration wherein four masks are designated as one block.

The blocking region 242 and the transmission region 241 of the mask panel 240 may be designated as one block or multiple numbers may be designated as one block, so the positions may alternately change by the unit of blocks as time passes. As illustrated in FIGS. 14 and 15, the blocks may be designated in a variety of combinations.

Figure 16:
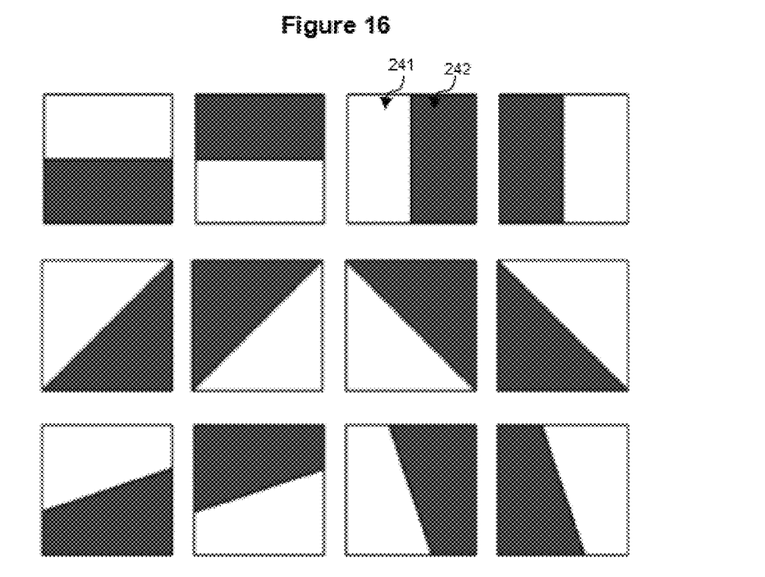
FIG. 16 are a schematic view illustrating a variety of exemplary embodiments of a mask pattern which applies to a depth-priority integral imaging display method using a nonuniform dynamic mask array according to the present inventive concept.

FIG. 16 is a schematic view illustrating a variety of exemplary embodiments of a mask pattern which applies to a depth-priority integral imaging display method using a nonuniform dynamic mask array according to the present inventive concept.

As illustrated in FIG. 16, the present inventive concept may be implemented in a variety of patterns which satisfy the following conditions.

1. The resolutions in both the horizontal and vertical direction can be enhanced based on two-times time multiplexing.

2. The entire resolutions of the 3D images can be enhanced two times as compared with the basic depth-priority integral imaging (DPII).

3. The masks with the same sizes can correspond to each basic lens.

4. The area of the transmission region in each mask is half of the basic lens, namely, the area of the blocking region of each mask is half of the basic lens.

5. If half of the area can be blocked and transmitted while dividing each basic lens into two parts, the shape of the mask is not limited.

As described above, the depth-priority integral imaging display method using a nonuniform dynamic mask array according to the present inventive concept makes it possible to enhance the resolutions in both horizontal and vertical directions in such a way to use a two-times time multiplexing. It is possible to enjoy the images of clear resolutions even in the product of 60 Hz, and the afterimages at the division boundary may be eliminated by changing the dividing direction of the mask, so the images with clearer resolutions can be displayed.

As the present inventive concept may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A depth-priority integral imaging display method using a nonuniform dynamic mask array, comprising:
   transmitting elemental images through a lens array and a mask panel, thus displaying 3D images, wherein the mask panel, includes a blocking region through which each elemental image cannot pass and a transmission region through which the elemental image can pass; and
   interchanging positions of the blocking region and the transmission region,
   wherein the blocking region and the transmission region both corresponding to each basic lens are designated as one block and the positions of the blocking region and the transmission region in the one block is interchanged as time passes,
   wherein the one block of the mask panel consists of one rectangular shaped blocking region having a long edge and a short edge, and one rectangular shaped transmission region having a long edge and a short edge, the one rectangular shaped blocking region and the one rectangular shaped transmission region having substantially a same area,
   wherein the long edges of the one rectangular shaped blocking region and the one rectangular shaped transmission region are arranged along a horizontal direction in a first block and are arranged along a vertical direction in a second block adjacent to the first block, and
   wherein the first block and the second block are alternately disposed along the horizontal direction and the vertical direction.

2. The method of claim 1, wherein locations of the one blocking region and the one transmission region is exchanged as time passes.

3. The method of claim 1, wherein a location of the one blocking region and the one transmission region rotates 90 degree as time passes.

4. The method of claim 1, wherein the blocking region and the transmission region have a stair shape and the blocking region and the transmission region are alternately disposed along a 45 degree direction with respect to the horizontal direction.

5. The method of claim 4, wherein the long edge of the one rectangular shaped blocking region in the first block directly contacts short edges of one rectangular shaped blocking region and one rectangular shaped transmission region in a second block which is adjacent to a first side of the first block, and
   wherein the long edge of the one rectangular shaped transmission region in the first block directly contacts short edges of one rectangular shaped blocking region and one rectangular shaped transmission region in a third block which is adjacent to a second side, which is opposite to the first side, of the first block.

6. A depth-priority integral imaging display method using a nonuniform dynamic mask array, comprising:
   transmitting elemental images through a lens array and a mask panel, thus displaying 3D images, wherein the mask panel includes a blocking regions through which each elemental image cannot pass and a transmission regions through which the elemental image can pass; and
   interchanging positions of the blocking region and the transmission region,
   wherein one of the blocking region and one of the transmission region both corresponding to each basic lens are designated as one block and the positions of the blocking region and the transmission region in the one block is interchanged as time passes,
   wherein the one block of the mask panel has a rectangular shape which includes one triangular shaped blocking region and one triangular shaped transmission region divided by a line connecting opposing corners of the rectangular shape, the one triangular shaped blocking region and the one triangular shaped transmission region having substantially a same area, and
   wherein a boundary between the one triangular shaped blocking region and the one triangular shaped transmission region is arranged in a straight line.

7. The method of claim 6, wherein location of the boundary between one blocking region and the one transmission region rotates 90 degree as time passes.

8. The method of claim 6, wherein the boundary between the one triangular blocking region and the one triangular transmission region forms 45 degree with respect to edges of the rectangular shape.

9. The method of claim 8, wherein the blocking regions are disposed on a first direction with respect to the boundary and the transmission regions are disposed on a second direction, which is opposite to the first direction, with respect to the boundary.

* * * * *